(12) United States Patent
Pan et al.

(10) Patent No.: US 11,858,822 B2
(45) Date of Patent: Jan. 2, 2024

(54) METHOD OF SEPARATING AND RECOVERING BROMINE FROM PRINTED CIRCUIT BOARD INCINERATION ASH BY TWO-STEP PROCESS

(71) Applicant: BEIJING UNIVERSITY OF TECHNOLOGY, Beijing (CN)

(72) Inventors: Dean Pan, Beijing (CN); Yufeng Wu, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 1039 days.

(21) Appl. No.: 16/627,721

(22) PCT Filed: Jan. 15, 2019

(86) PCT No.: PCT/CN2019/071755
§ 371 (c)(1),
(2) Date: Dec. 30, 2019

(87) PCT Pub. No.: WO2020/057025
PCT Pub. Date: Mar. 26, 2020

(65) Prior Publication Data
US 2023/0192488 A1    Jun. 22, 2023

(30) Foreign Application Priority Data
Sep. 17, 2018    (CN) .......................... 201811083253.4

(51) Int. Cl.
*C01B 7/09*    (2006.01)
*C01G 9/06*    (2006.01)
(Continued)

(52) U.S. Cl.
CPC ............... *C01B 7/096* (2013.01); *C01G 9/06* (2013.01); *C01G 21/20* (2013.01); *C22B 7/008* (2013.01);
(Continued)

(58) Field of Classification Search
None
See application file for complete search history.

(56) References Cited

FOREIGN PATENT DOCUMENTS

| CN | 106011488 A | 10/2016 |
|---|---|---|
| CN | 108118157 | * 6/2018 |

(Continued)

OTHER PUBLICATIONS

The International Search Report of corresponding International application No. PCT/CN2019/071755, dated Jun. 5, 2019.

*Primary Examiner* — Sheng H Davis
(74) *Attorney, Agent, or Firm* — J.C. PATENTS

(57) ABSTRACT

The invention relates to the field of efficient separation and recovery of bromine by full wet method, especially to a two-step separating method of bromide and recovery of lead and zinc from printed circuit board Incineration ash. It mainly includes first sodium hydroxide alkaline leaching, secondary sodium peroxide alkaline leaching, pH adjustment, separate lead and zinc, bromide evaporation and crystallization to recover crude bromide and other steps. Compared with traditional comprehensive recovery process of ash, the invention uses sodium hydroxide to dissolve bromide, lead and zinc, and uses the strong oxidation of sodium peroxide in alkaline environment, copper bromide and other bromine are oxidized and leached; through two-step method, the efficient leaching of bromine, lead and zinc is realized, silver and other precious metals are enriched at the same time. It is beneficial to subsequent recovery of precious metals and has the characteristics of short tail liquid discharge.

3 Claims, 1 Drawing Sheet

(51) Int. Cl.
*C01G 21/20* (2006.01)
*C22B 7/00* (2006.01)
*C22B 7/02* (2006.01)
*C22B 3/00* (2006.01)

(52) U.S. Cl.
CPC .............. *C22B 7/02* (2013.01); *C22B 13/045* (2013.01); *C22B 19/24* (2013.01)

(56) References Cited

FOREIGN PATENT DOCUMENTS

| | | |
|---|---|---|
| CN | 108118157 A | 6/2018 |
| CN | 108165754 A | 6/2018 |
| CN | 109095496 A | 12/2018 |
| CN | 109112313 A | 1/2019 |
| WO | 2016132319 A1 | 8/2016 |

\* cited by examiner

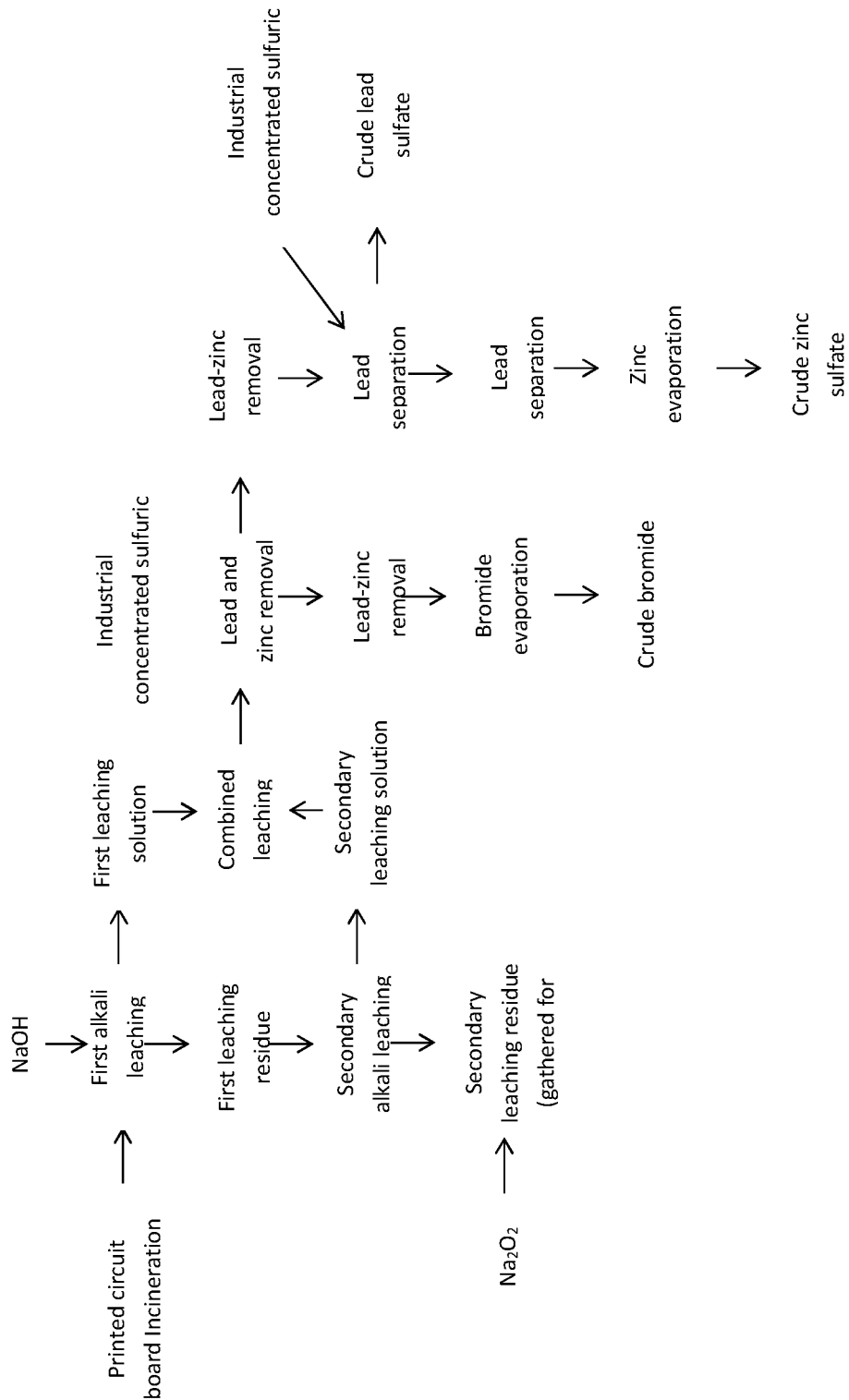

METHOD OF SEPARATING AND RECOVERING BROMINE FROM PRINTED CIRCUIT BOARD INCINERATION ASH BY TWO-STEP PROCESS

TECHNICAL FIELD

The invention relates to the field of efficient separation and recovery of bromine by full wet method, especially to a two-step separating method of bromide and recovery of lead and zinc from printed circuit board Incineration ash.

BACKGROUND ART

Electric waste contains a lot of heavy metals and other toxic and harmful components, such as lead, mercury, hexavalent chromium, PCBS and flame retardants. Once these substances are not properly handled, they will easily enter the environment and cause serious pollution to groundwater, soil and atmosphere, threatening human health. For example, in process of e-waste incineration, heavy metals such as mercury, lead and chromium are easy to be taken away by smoke and concentrated in fly ash, causing serious air pollution. Lead destroys the nerves, blood system and kidney of human; chromium compounds can penetrate skin and penetrate cells, small amounts can cause severe allergies even cause asthma and damage DNA; Mercury can damage nerves in the brain. In addition, the circuit boards are generally equipped with flame retardants, when burns, it releases carcinogenic substances such as diamonium and furan, which are harmful to human health. The main components of some typical electron exhausts are shown below:

| pollutant | source | detriment |
|---|---|---|
| Halocarbon | refrigerator | damage the ozone layer |
| brominated flame retardant | circuit board, cable, shell, etc | dioxins are produced when burned |
| PVC | wire | dioxins are produced when burned |
| mercury | display | damage to the central nervous system, affect fetal development and kidney function, minamata disease |
| Lead | CRT, capacitance and display | damage nervous, blood system and kidney, affect children's intellectual development |

The principle of pyrometallurgy is to separate nonmetallic and metallic materials from each other by high temperature. Some nonmetallic materials become gas and escape from the melt system. The other part is floating in the upper layer of metal melt material in form of scum. The precious metal forms an alloy with the base metal in molten state, after removing the scum on surface, molten alloy is injected into corresponding mold for cooling, and then precious metal is separated from metal through refining or electrolysis, and target metal is separated from other precious metals at the same time.

Guiyu adopts environmental protection melting pool melting technology to deal with waste printed circuit board technology application platform in 2014. The successful implementation of this technology will be beneficial to fundamentally change the traditional incineration mode and reduce environmental problems caused by smoke generated by burning circuit boards. At the same time, it also lays a solid technical foundation for the group company to enter the field of urban mineral products, which has better economic benefits, environmental benefits and long-term social benefits. The amount of smoke generated by 20,000 tons of circuit board model line per year is set as is 10886 $m^3/h$, dust content of the flue gas is 5 $g/Nm^3$, operating time is 300 days with 24 hour per day, and it will produce about 360 tons of ash a year. The production of circuit board in China is more than one million tons, and its circuit board incineration ash will be tens of thousands of tons, with a considerable processing capacity. As mentioned above, the ash contains iron, tin, antimony, zinc, lead, copper, gold, silver, etc., which has great recycling value. However, due to the complex types and quantities of impurity ions (such as halogen elements and chlorobromine) in smelting process, the recycling is adversely affected. Existing valuable metal recovery process can not meet the comprehensive recovery requirements of circuit board incinerated ash.

Due to a large number of brominated flame retardants in circuit boards, there is a large amount of bromine in circuit board incineration ash. In the process of circuit board incineration, bromine mainly exists in form of hydrogen bromide and bromide salt. In order to avoid pollution of bromine in ash, circuit board adopts cloth bag dust removal in incineration process, first collects dust in flue gas, and at the same time adopts two-stage bromide absorption and activated carbon absorption to reach the emission standard of flue gas. Therefore, there is a large amount of bromine in the ashes of circuit board incineration. Through XRF and XRD analysis, main valuable elements in ash are bromine, lead, zinc, copper and precious metals. Due to the high content of elements such as bromine, zinc and lead, and the low content of precious metals, such as direct recovery of precious metals, resulting in bromide pollution waste affect the recovery of precious metals. Therefore, the recovery of bromide becomes an important part of recycling from incineration ash. Bromine salts are mainly stored in form of soluble bromide and insoluble cuprous bromide, If conventional alkaline leaching is used, cuprous bromide cannot be effectively treated, resulting in a low recovery of bromine. Sodium peroxide has a strong oxidation property in alkaline aqueous solution. Treating incineration ash with sodium peroxide can effectively oxidize cuprous bromide and effectively separate bromide. At the same time, the aqueous of sodium peroxide is highly alkaline, similar to sodium hydroxide, It has good solubility to lead and zinc, but low solubility to copper and precious metal, so it can be used to separate lead and zinc. The invention adopts a two-step treatment method, using sodium hydroxide and sodium peroxide as alkaline leaching medium, to effectively separate bromine salt and recover lead and zinc at the same time, so as to achieve the enrichment effect of copper and precious metals and provide a foundation for efficient recovery of copper and precious metals. The pretreatment and recovery process can realize efficient separation and recovery of valuable elements, and at the same time, tailless liquid is discharged without secondary wastewater, which has significant environmental and economic benefits.

SUMMARY

The purpose of the invention is to solve the problem of efficient separation of bromide from circuit board incineration ash and recovery of valuable metals such as lead and zinc, which has the characteristics of high added value and tailless liquid discharge. The two-step method of separating and recovering bromine from circuit board incineration ash is carried out according to the following steps:
(1) First alkali leaching: proceed first alkali leaching for circuit board incineration ash in sodium hydroxide solution, where the mass concentration of sodium hydroxide is 5%-15%, solid-liquid ratio of ash to leach solution is 1:10-1:15 Kg/L, leaching temperature is 55-75° C., leaching time is 0.5-1 h, first leaching residue and first leaching solution is obtained after filtration;

(2) Secondary alkali leaching: water is added to first leaching residue obtained in (1) for secondary alkali leaching, solid-liquid ratio of first leaching residue and water is 1:5-1:10 Kg/L, leaching temperature is room temperature and add sodium peroxide in leaching process, solid-liquid ratio of sodium peroxide and water is 20:1-50:1 Kg/m$^3$, after adding sodium peroxide, stir 0.5-2 hours, and filter to get secondary leaching residue and secondary leaching solution, secondary leaching residue is gathered for treatment;

(3) Lead and Zinc removal: combine first leaching solution obtained in (1) and secondary leaching solution obtained in (2) to obtain combined leaching solution, the mass ratio of first leaching solution and secondary leaching solution is 1:3-3:1, add 98% industrial concentrated sulfuric acid to combined leaching solution until the pH of the combined solution reaches 6.5-8, lead-zinc removal residue and lead-zinc removal solution are obtained by filtration;

(4) Bromide evaporation and crystallization: proceed evaporation and crystallization for lead-zinc removal solution obtained in (3), crude bromide is obtained;

(5) Lead separation: add lead-zinc removal residue obtained in (3) into water, solid-liquid ratio of lead-zinc removal residue and water is 1:1-1:2 Kg/L, add 98% industrial concentrated sulfuric acid with stirring until the solution pH is 4.5-6. Filter to get lead sulfate and lead separation solution;

(6) Zinc evaporation and crystallization: proceed evaporation and crystallization for lead separation solution obtained in (5), crude zinc sulfate is obtained.

Compared with traditional comprehensive recovery process of ash, the invention uses sodium hydroxide to dissolve bromide, lead and zinc, and uses the strong oxidation of sodium peroxide in alkaline environment, copper bromide and other bromine are oxidized and leached; through two-step method, the efficient leaching of bromine, lead and zinc is realized, silver and other precious metals are enriched at the same time. It is beneficial to subsequent recovery of precious metals and has the characteristics of short tail liquid discharge.

THE APPENDED DRAWING

FIG. 1 is the flow chart of two-step separation and recovery of bromine from circuit board incineration ash.

PREFERRED EMBODIMENT

Embodiment 1

(1) First alkali leaching: proceed first alkali leaching for circuit board incineration ash in sodium hydroxide solution, where the mass concentration of sodium hydroxide is 5%, solid-liquid ratio of ash to leach solution is 1:10 Kg/L, leaching temperature is 55° C., leaching time is 0.5 h, first leaching residue and first leaching solution is obtained after filtration;

(2) Secondary alkali leaching: water is added to first leaching residue obtained in (1) for secondary alkali leaching, solid-liquid ratio of first leaching residue and water is 1:5 Kg/L, leaching temperature is room temperature and add sodium peroxide in leaching process, solid-liquid ratio of sodium peroxide and water is 20:1 Kg/m$^3$, after adding sodium peroxide, stir 0.5 hours, and filter to get secondary leaching residue and secondary leaching solution, secondary leaching residue is gathered for treatment;

(3) Lead and Zinc removal: combine first leaching solution obtained in (1) and secondary leaching solution obtained in (2) to obtain combined leaching solution, the mass ratio of first leaching solution and secondary leaching solution is 1:3, add 98% industrial concentrated sulfuric acid to combined leaching solution until the pH of the combined solution reaches 6.5, lead-zinc removal residue and lead-zinc removal solution are obtained by filtration;

(4) Bromide evaporation and crystallization: proceed evaporation and crystallization for lead-zinc removal solution obtained in (3), crude bromide is obtained;

(5) Lead separation: add lead-zinc removal residue obtained in (3) into water, solid-liquid ratio of lead-zinc removal residue and water is 1:1 Kg/L, add 98% industrial concentrated sulfuric acid with stirring until the solution pH is 4.5. Filter to get lead sulfate and lead separation solution;

(6) Zinc evaporation and crystallization: proceed evaporation and crystallization for lead separation solution obtained in (5), crude zinc sulfate is obtained.

Recovery rates of bromide are 98.3%, lead 97.1% and zinc 98.3%.

Embodiment 2

(1) First alkali leaching: proceed first alkali leaching for circuit board incineration ash in sodium hydroxide solution, where the mass concentration of sodium hydroxide is 15%, solid-liquid ratio of ash to leach solution is 1:15 Kg/L, leaching temperature is 75° C., leaching time is 1 h, first leaching residue and first leaching solution is obtained after filtration;

(2) Secondary alkali leaching: water is added to first leaching residue obtained in (1) for secondary alkali leaching, solid-liquid ratio of first leaching residue and water is 1:10 Kg/L, leaching temperature is room temperature and add sodium peroxide in leaching process, solid-liquid ratio of sodium peroxide and water is 50:1 Kg/m$^3$, after adding sodium peroxide, stir 2 hours, and filter to get secondary leaching residue and secondary leaching solution, secondary leaching residue is gathered for treatment;

(3) Lead and Zinc removal: combine first leaching solution obtained in (1) and secondary leaching solution obtained in (2) to obtain combined leaching solution, the mass ratio of first leaching solution and secondary leaching solution is 3:1, add 98% industrial concentrated sulfuric acid to combined leaching solution until the pH of the combined solution reaches 8, lead-zinc removal residue and lead-zinc removal solution are obtained by filtration;

(4) Bromide evaporation and crystallization: proceed evaporation and crystallization for lead-zinc removal solution obtained in (3), crude bromide is obtained;

(5) Lead separation: add lead-zinc removal residue obtained in (3) into water, solid-liquid ratio of lead-zinc removal residue and water is 1:2 Kg/L, add 98% industrial concentrated sulfuric acid with stirring until the solution pH is 6. Filter to get lead sulfate and lead separation solution;

(6) Zinc evaporation and crystallization: proceed evaporation and crystallization for lead separation solution obtained in (5), crude zinc sulfate is obtained.

Recovery rates of bromide are 99.3%, lead 99.5% and zinc 99.3%.

Embodiment 3

(1) First alkali leaching: proceed first alkali leaching for circuit board incineration ash in sodium hydroxide solution, where the mass concentration of sodium hydroxide is 10%, solid-liquid ratio of ash to leach solution is 1:12 Kg/L, leaching temperature is 65° C., leaching time is 1 h, first leaching residue and first leaching solution is obtained after filtration;

(2) Secondary alkali leaching: water is added to first leaching residue obtained in (1) for secondary alkali leaching, solid-liquid ratio of first leaching residue and water is 1:8 Kg/L, leaching temperature is room temperature and add sodium peroxide in leaching process, solid-liquid ratio of sodium peroxide and water is 35:1 Kg/m$^3$, after adding sodium peroxide, stir 1 hours, and filter to get secondary leaching residue and secondary leaching solution, secondary leaching residue is gathered for treatment;

(3) Lead and Zinc removal: combine first leaching solution obtained in (1) and secondary leaching solution obtained in (2) to obtain combined leaching solution, the mass ratio of first leaching solution and secondary leaching solution is 1:1, add 98% industrial concentrated sulfuric acid to combined leaching solution until the pH of the combined solution reaches 7, lead-zinc removal residue and lead-zinc removal solution are obtained by filtration;

(4) Bromide evaporation and crystallization: proceed evaporation and crystallization for lead-zinc removal solution obtained in (3), crude bromide is obtained;

(5) Lead separation: add lead-zinc removal residue obtained in (3) into water, solid-liquid ratio of lead-zinc removal residue and water is 1:1.5 Kg/L, add 98% industrial concentrated sulfuric acid with stirring until the solution pH is 5. Filter to get lead sulfate and lead separation solution;

(6) Zinc evaporation and crystallization: proceed evaporation and crystallization for lead separation solution obtained in (5), crude zinc sulfate is obtained.

Recovery rates of bromide are 97.8%, lead 98.2% and zinc 99.1%.

Embodiment 4

(1) First alkali leaching: proceed first alkali leaching for circuit board incineration ash in sodium hydroxide solution, where the mass concentration of sodium hydroxide is 5%, solid-liquid ratio of ash to leach solution is 1:15 Kg/L, leaching temperature is 55° C., leaching time is 1 h, first leaching residue and first leaching solution is obtained after filtration;

(2) Secondary alkali leaching: water is added to first leaching residue obtained in (1) for secondary alkali leaching, solid-liquid ratio of first leaching residue and water is 1:5 Kg/L, leaching temperature is room temperature and add sodium peroxide in leaching process, solid-liquid ratio of sodium peroxide and water is 50:1 Kg/m$^3$, after adding sodium peroxide, stir 0.5 hours, and filter to get secondary leaching residue and secondary leaching solution, secondary leaching residue is gathered for treatment;

(3) Lead and Zinc removal: combine first leaching solution obtained in (1) and secondary leaching solution obtained in (2) to obtain combined leaching solution, the mass ratio of first leaching solution and secondary leaching solution is 2:1, add 98% industrial concentrated sulfuric acid to combined leaching solution until the pH of the combined solution reaches 8, lead-zinc removal residue and lead-zinc removal solution are obtained by filtration;

(4) Bromide evaporation and crystallization: proceed evaporation and crystallization for lead-zinc removal solution obtained in (3), crude bromide is obtained;

(5) Lead separation: add lead-zinc removal residue obtained in (3) into water, solid-liquid ratio of lead-zinc removal residue and water is 1:1 Kg/L, add 98% industrial concentrated sulfuric acid with stirring until the solution pH is 6. Filter to get lead sulfate and lead separation solution;

(6) Zinc evaporation and crystallization: proceed evaporation and crystallization for lead separation solution obtained in (5), crude zinc sulfate is obtained.

Recovery rates of bromide are 96.9%, lead 96.8% and zinc 97.2%.

Embodiment 5

(1) First alkali leaching: proceed first alkali leaching for circuit board incineration ash in sodium hydroxide solution, where the mass concentration of sodium hydroxide is 15%, solid-liquid ratio of ash to leach solution is 1:10 Kg/L, leaching temperature is 75° C., leaching time is 0.5 h, first leaching residue and first leaching solution is obtained after filtration;

(2) Secondary alkali leaching: water is added to first leaching residue obtained in (1) for secondary alkali leaching, solid-liquid ratio of first leaching residue and water is 1:10 Kg/L, leaching temperature is room temperature and add sodium peroxide in leaching process, solid-liquid ratio of sodium peroxide and water is 20:1 Kg/m$^3$, after adding sodium peroxide, stir 2 hours, and filter to get secondary leaching residue and secondary leaching solution, secondary leaching residue is gathered for treatment;

(3) Lead and Zinc removal: combine first leaching solution obtained in (1) and secondary leaching solution obtained in (2) to obtain combined leaching solution, the mass ratio of first leaching solution and secondary leaching solution is 1:2, add 98% industrial concentrated sulfuric acid to combined leaching solution until the pH of the combined solution reaches 6.5, lead-zinc removal residue and lead-zinc removal solution are obtained by filtration;

(4) Bromide evaporation and crystallization: proceed evaporation and crystallization for lead-zinc removal solution obtained in (3), crude bromide is obtained;

(5) Lead separation: add lead-zinc removal residue obtained in (3) into water, solid-liquid ratio of lead-zinc removal residue and water is 1:2 Kg/L, add 98% industrial concentrated sulfuric acid with stirring until the solution pH is 4.5. Filter to get lead sulfate and lead separation solution;

(6) Zinc evaporation and crystallization: proceed evaporation and crystallization for lead separation solution obtained in (5), crude zinc sulfate is obtained.

Recovery rates of bromide are 97.2%, lead 99.1% and zinc 96.1%.

Embodiment 6

(1) First alkali leaching: proceed first alkali leaching for circuit board incineration ash in sodium hydroxide solution, where the mass concentration of sodium hydroxide is 12%, solid-liquid ratio of ash to leach solution is 1:14 Kg/L, leaching temperature is 70° C., leaching time is 1 h, first leaching residue and first leaching solution is obtained after filtration;

(2) Secondary alkali leaching: water is added to first leaching residue obtained in (1) for secondary alkali leaching, solid-liquid ratio of first leaching residue and water is 1:6 Kg/L, leaching temperature is room temperature and add sodium peroxide in leaching process, solid-liquid ratio of sodium peroxide and water is 30:1 Kg/m$^3$, after adding sodium peroxide, stir 1.5 hours, and filter to get secondary leaching residue and secondary leaching solution, secondary leaching residue is gathered for treatment;

(3) Lead and Zinc removal: combine first leaching solution obtained in (1) and secondary leaching solution obtained in (2) to obtain combined leaching solution, the mass ratio of first leaching solution and secondary leaching solution is 2.5:1, add 98% industrial concentrated sulfuric acid to combined leaching solution until the pH of the combined solution reaches 7.5, lead-zinc removal residue and lead-zinc removal solution are obtained by filtration;

(4) Bromide evaporation and crystallization: proceed evaporation and crystallization for lead-zinc removal solution obtained in (3), crude bromide is obtained;

(5) Lead separation: add lead-zinc removal residue obtained in (3) into water, solid-liquid ratio of lead-zinc removal residue and water is 1:1.6 Kg/L, add 98% industrial concentrated sulfuric acid with stirring until the solution pH is 5.8. Filter to get lead sulfate and lead separation solution;

(6) Zinc evaporation and crystallization: proceed evaporation and crystallization for lead separation solution obtained in (5), crude zinc sulfate is obtained.

Recovery rates of bromide are 99.1%, lead 98.0% and zinc 96.9%.

What is claimed is:

1. A method of separating and recovering bromine from a circuit board incineration ash by a two-step process:
   (1) a first alkali leaching process comprising: placing the circuit board incineration ash in a sodium hydroxide solution, filtering the solution of sodium hydroxide containing the circuit board incineration ash to obtain a first leaching residue and a first leaching solution;
   (2) a secondary alkali leaching process comprising: adding water to the first leaching residue obtained in step (1), and filtering to obtain a secondary leaching residue and a secondary leaching solution;
   (3) a lead and zinc removal process comprising: combining the first leaching solution obtained in step (1) and the secondary leaching solution obtained in step (2) to obtain a combined leaching solution, a mass ratio of the first leaching solution to the secondary leaching solution is 1:3-3:1, adding 98% industrial concentrated sulfuric acid to the combined leaching solution until a pH of the combined leaching solution reaches 6.5-8, filtering the combined leaching solution to obtain a lead-zinc removal residue and a lead-zinc removal solution;
   (4) a bromide evaporation and crystallization process comprising: conducting evaporation and crystallization of the lead-zinc removal solution obtained in step (3), to obtain a crude bromide;
   (5) a lead separation process comprising: adding the lead-zinc removal residue obtained in step (3) into water to produce a solid-liquid ratio of the lead-zinc removal residue and water of 1:1-1:2 Kg/L, adding 98% industrial concentrated sulfuric acid while stirring until the pH reaches 4.5-6; filtering to obtain lead sulfate and a lead separation solution;
   (6) a zinc evaporation and crystallization process comprising: conducting evaporation and crystallization of the lead separation solution obtained in step (5), to obtain a crude zinc sulfate.

2. The method of separating and recovering bromine from a circuit board incineration ash by a two-step process according to claim 1, wherein a mass concentration of the sodium hydroxide is 5%-15%, a solid-liquid ratio of the circuit board incineration ash to the sodium hydroxide solution is 1:10-1:15 Kg/L, leaching temperature is 55-75° C., leaching time is 0.5-1 h.

3. The method of separating and recovering bromine from a circuit board incineration ash by a two-step process according to claim 1, wherein a solid-liquid ratio of the first leaching residue to water is 1:5-1:10 Kg/L and a leaching temperature is room temperature, and the secondary alkali leaching process further comprising adding sodium peroxide, a solid-liquid ratio of sodium peroxide and water is 20:1-50:1 Kg/m$^3$, after adding sodium peroxide, stirring 0.5-2 hours.

* * * * *